(12) United States Patent
Amoako

(10) Patent No.: US 10,785,749 B2
(45) Date of Patent: Sep. 22, 2020

(54) ENHANCED PAGING FOR STATIONARY OR LOW MOBILITY WIRELESS DEVICES

(71) Applicant: Telefonaktiebolaget LM Ericsson (publ), Stockholm (SE)

(72) Inventor: Kwame Appiah Amoako, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/332,126

(22) PCT Filed: Sep. 13, 2017

(86) PCT No.: PCT/IB2017/055536
§ 371 (c)(1),
(2) Date: Mar. 11, 2019

(87) PCT Pub. No.: WO2018/051249
PCT Pub. Date: Mar. 22, 2018

(65) Prior Publication Data
US 2019/0268875 A1    Aug. 29, 2019

Related U.S. Application Data

(60) Provisional application No. 62/394,482, filed on Sep. 14, 2016.

(51) Int. Cl.
*H04W 68/02* (2009.01)
*H04W 76/11* (2018.01)
*H04W 8/08* (2009.01)
*H04W 68/00* (2009.01)
*H04W 60/00* (2009.01)

(52) U.S. Cl.
CPC .............. *H04W 68/02* (2013.01); *H04W 8/08* (2013.01); *H04W 68/005* (2013.01); *H04W 76/11* (2018.02); *H04W 60/00* (2013.01)

(58) Field of Classification Search
None
See application file for complete search history.

(56) References Cited

U.S. PATENT DOCUMENTS

2015/0141062 A1   5/2015   Ostrup et al.
2015/0215895 A1   7/2015   Iwai et al.
(Continued)

OTHER PUBLICATIONS

International Search Report and Written Opinion dated Dec. 21, 2017 issued in corresponding PCT Application No. PCT/IB2017/055536, consisting of 16 pages.

*Primary Examiner* — Otis L Thompson, Jr.
(74) *Attorney, Agent, or Firm* — Sage Patent Group

(57) ABSTRACT

A method, network node and wireless device for regulating paging of a wireless device in a wireless communication system are provided. According to one aspect, a method includes receiving at a current network node current enhanced paging identification, EPI, information. The EPI information includes an identification of the wireless device, an identification of a base station serving the wireless device, and a status of the wireless device as being one of a stationary device and a low mobility device. The method further includes receiving a paging request that identifies the wireless device and transmitting the paging request to only the base station serving the wireless device, as indicated by the current EPI information.

6 Claims, 15 Drawing Sheets

(56) References Cited

U.S. PATENT DOCUMENTS

| | | |
|---|---|---|
| 2016/0183215 A1 | 1/2016 | Horn et al. |
| 2016/0057730 A1 | 2/2016 | Truelove et al. |
| 2017/0150467 A1* | 5/2017 | Tamura .................. H04W 48/00 |
| 2018/0175929 A1* | 6/2018 | Wang ..................... H04W 76/14 |
| 2019/0116529 A1* | 4/2019 | Lu ........................ H04L 63/0892 |

* cited by examiner

US 10,785,749 B2

ENHANCED PAGING FOR STATIONARY OR LOW MOBILITY WIRELESS DEVICES

CROSS-REFERENCE TO RELATED APPLICATIONS

This application is a Submission Under 35 U.S.C. § 371 for U.S. National Stage Patent Application of International Application No.: PCT/IB2017/055536, filed Sep. 13, 2017 entitled "ENHANCED PAGING FOR STATIONARY OR LOW MOBILITY WIRELESS DEVICES," which claims priority to U.S. Provisional Application No. 62/394,482, filed Sep. 14, 2016, entitled "ENHANCED PAGING FOR STATIONARY OR LOW MOBILITY WIRELESS DEVICES," the entireties of all of which are incorporated herein by reference.

TECHNICAL FIELD

This disclosure relates to wireless communications, and in particular, enhanced paging for stationary or low mobility wireless devices.

BACKGROUND

In a typical cellular radio system, wireless devices communicate via a radio access network (RAN) with one or more core networks. The wireless devices (WD) can be mobile stations or other types of wireless devices, such as user equipment (UE) devices, portable, pocket, hand-held, computer-included, or car-mounted mobile devices which communicate voice and/or data with radio access network, e.g., mobile telephones and laptops with wireless capability.

The RAN covers a geographical area which is divided into cell areas, with each cell area or group of cell areas being served by a radio access node. A cell is a geographical area where radio coverage is provided by equipment at the radio access node. Each cell is identified by an identity within the local radio area. The radio access nodes communicate over the air interface with the wireless devices within the cells served by the node.

The Universal Mobile Telecommunications System (UMTS) is a third generation mobile communication system, which evolved from the Global System for Mobile Communications (GSM) and is intended to provide improved mobile communication services based on Wideband Code Division Multiple Access (WCDMA) access technology. UTRAN is essentially a radio access network using wideband code division multiple access for wireless devices. The Third Generation Partnership Project (3GPP) has undertaken to evolve further the UTRAN and GSM based radio access network technologies. Specifications for the Evolved Universal Terrestrial Radio Access Network (E-UTRAN) are ongoing within the 3GPP. Another name used for E-UTRAN is the Long Term Evolution (LTE) RAN.

Long Term Evolution RAN is a 3GPP radio access technology wherein a flat architecture is used with nodes of a single type connected directly to a core network. The LTE RAN includes evolved radio access nodes, e.g., evolved NodeBs (also known as eNodeBs or eNBs), which are base stations providing evolved UTRA user-plane and control-plane protocol terminations toward the wireless devices. The eNodeB or base station is a logical node and not a physical implementation. A common implementation of an eNodeB or base station is a three-sector site, where the eNodeB or base station includes equipment for handling transmissions in three cells. However, other implementations can be found as well. The eNodeB or base station hosts functions for radio resource management, mobility management and user plane functions, among others. The X2 interface connects eNodeB or base stations to each other.

The eNodeB or base station is connected to the core-network by means of the S1 interface. One eNodeB or base station can be connected to multiple Mobility Management Entities. A Mobility Management Entity (MME) is the core network node responsible for mobility management, e.g., wireless device tracking and paging procedures.

Paging is used for network-initiated connection setup when the wireless device is in a Radio Resource Control idle mode (RRC_IDLE). In idle mode, the wireless device does not belong to a specific cell. No data transfer may take place as the wireless device is in idle mode, RRC_IDLE, most of the time in order to reduce battery consumption. The wireless device in RRC_IDLE is periodically enabled to receive paging messages from the network. FIG. 1 is a block diagram of the conventional method of distributing a paging request in a wireless communication system, where it can be seen that the paging request is distributed to multiple base stations and multiple cells.

Each time a wireless device attaches to the network, it also performs a Tracking Area Update (TAU) procedure and registers in a certain Tracking Area (TA). The Tracking Area represents a group of cells, preferably adjacent cells. Each eNodeB or base station may handle radio transmission in cells belonging to different tracking areas. A Tracking Area List represents a group of Tracking Areas, thus including a higher number of cells than the Tracking Area. In response to the registration, the wireless device receives a Tracking Area List from the network and as long as the wireless device is present in one of the Tracking Areas within the Tracking Area List the wireless device does not have to perform a new TAU procedure.

In LTE, the mechanism for downlink data transmission on the Downlink Shared Channel (DL-SCH) is used for paging. The wireless device monitors control signaling for downlink scheduling assignments related to paging. The location of the wireless device in Idle Mode is not known on a cell level; thus, the paging message is typically transmitted across multiple cells. The MME initiates the paging procedure by sending a paging message to one or more eNodeB or base stations. In LTE, an S1 paging message is sent from the MME to the eNodeB or base station to request paging of a certain wireless device. In present LTE systems, paging is escalated from an eNodeB or base station level, to a Tracking Area, TA, level and finally to a Tracking Area List level.

The tracking area is controlled by the MME. Typically, the eNodeB or base station in which the MME knows the wireless device to have been present last is first asked to perform the paging procedure (in all configured cells) a number of times. If no page response is received, the eNodeB or base stations are secondly asked to perform the paging procedure in cells of the eNodeB or base stations belonging to a Tracking Area, and last the eNodeB or base stations are asked to perform the paging procedure in cells of the eNodeB or base stations belonging to the Tracking Area List. However, if a TA is extensive, escalating from eNodeB or base station level to Tracking Area level could imply an escalation from one eNodeB or base station up to 100 eNodeB or base stations or more involved in the page of one wireless device, wireless device. Such escalation will incur a high paging load on the radio access network.

SUMMARY

Some embodiments advantageously provide a method and system for regulating paging of a wireless device in a wireless communication system. According to one aspect, a method includes receiving at a current network node current enhanced paging identification, EPI, information. The EPI information includes an identification of the wireless device, an identification of a base station serving the wireless device, and a status of the wireless device as being one of a stationary device and a low mobility device. The method further includes receiving a paging request that identifies the wireless device and transmitting the paging request to only the base station serving the wireless device, as indicated by the current EPI information.

According to this aspect, in some embodiments, the paging request further identifies the cell where the wireless device is located and the EPI information further includes the cell identification where the wireless device is located. In some embodiments, the current EPI information further includes a network node identification that identifies a previous network node to which the wireless device was attached. In some embodiments, the method further includes comparing the previous network node identification to an identification of the current network node, and when the current network node identification is different from the previous network node identification, sending a deletion request to the previous network node to cause deletion of previous EPI information at the previous network node corresponding to the wireless device. In some embodiments, the network node is an MME.

According to another aspect, a network node is configured to regulate paging of a wireless device in a wireless communication system. The network node includes processing circuitry configured to store current enhanced paging identification, EPI, information. The current EPI information includes an identification of a wireless device, an identification of a base station serving the wireless device, and a status of the wireless device as being one of a stationary device and a low mobility device. The processing circuitry is also configured to receive a paging request that identifies the wireless device, and transmit the paging request to only the base station serving the wireless device, as indicated by the current EPI information.

According to this aspect, in some embodiments, the paging request further identifies the cell where the wireless device is located and the EPI information further includes the cell identification where the wireless device is located. In some embodiments, the current EPI information further includes a network node identification that identifies a previous network node to which the wireless device was attached. In some embodiments, the processing circuitry is further configured to compare a previous network node identification to a current network node identification, and when the current network node identification is different from the previous network node identification, sending a deletion request to the previous network node to cause deletion of a previous EPI corresponding to the wireless device. In some embodiments, the network node is an MME.

According to yet another aspect, in some embodiments, a network node is configured to regulate paging of a wireless device in a wireless communication system. The network node includes a memory module configured to store current enhanced paging identification, EPI, information, the current EPI information including an identification of a wireless device, an identification of a base station serving the wireless device, and a status of the wireless device as being one of a stationary device and a low mobility device. The network node further includes a paging request receiver module configured to receive a paging request that identifies the wireless device and a paging request transmitter module configured to transmit the paging request to only the base station serving the wireless device, as indicated by the current EPI information.

According to yet another aspect, in some embodiments, a method of regulating paging of a wireless device in a wireless communication system is provided. The method includes receiving at a base station an identification of a wireless device and a status of a wireless device as being one of a stationary device and a low mobility device. The method further includes associating the identification and status of the wireless device with an identification of the base station, the identification and status of the wireless device and the identification of the base station forming enhanced paging identification, EPI information, and sending the EPI information to a network node.

According to this aspect, in some embodiments, the method further includes including in the EPI information sent to the network node an identification of a cell where the wireless device is located. In some embodiments, the method further includes receiving a paging request and broadcasting the paging request only to the cell where the wireless device is located.

According to yet another aspect, a base station is configured to regulate paging of a wireless device in a wireless communication system. The base station includes processing circuitry. The processing circuitry is configured to store current enhanced paging identification, EPI, information, the EPI information including an identification of a wireless device being served by the base station, an identification of the base station, and a status of the wireless device as being one of a stationary device and a low mobility device. The processing circuitry is further configured to send the EPI information to a network node and forward a paging request to a cell where the wireless device is located.

According to this aspect, in some embodiments, the processing circuitry is further configured to send to the network node with the EPI information an identification of a cell where the wireless device is located. In some embodiments, the processing circuitry is further configured to broadcast a paging request only to the cell where the wireless device is located.

According to another aspect, a base station is configured to regulate paging of a wireless device in a wireless communication system. The base station has a memory module configured to store current enhanced paging identification, EPI, information, the EPI information including an identification of a wireless device being served by the base station, an identification of the base station, and a status of the wireless device as being one of a stationary device and a low mobility device. The base station also has a transmission module configured to send the EPI information to a network node. The base station further includes a paging request forwarding module configured to forward a paging request to a cell where the wireless device is configured.

According to another aspect, a method in a wireless device having a status of one of being stationary and of low mobility is provided. The method includes communicating to a base station serving the wireless device a status of the wireless device as being one of stationary and of low mobility. According to this aspect, in some embodiments, the method further includes detecting a change in cell identification and communicating a notification of a change in cell identification to the base station.

According to another aspect, a wireless device having a status of one of being stationary and of low mobility is provided. The wireless device includes processing circuitry. The processing circuitry is configured to store a cell identification. The processing circuitry is configured to communicate to a base station serving the wireless device a status of the wireless device as being one of stationary and of low mobility. According to this aspect, in some embodiments, the processing circuitry is further configured to detect a change in cell identification and communicate a notification of the change in cell identification.

According to another aspect, a wireless device having a status of one of being stationary and of low mobility is provided. The wireless device includes a memory module configured to store a cell identification. The wireless device includes a status communication module configured to communicate to a base station serving the wireless device a status of the wireless device as being one of stationary and of low mobility.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
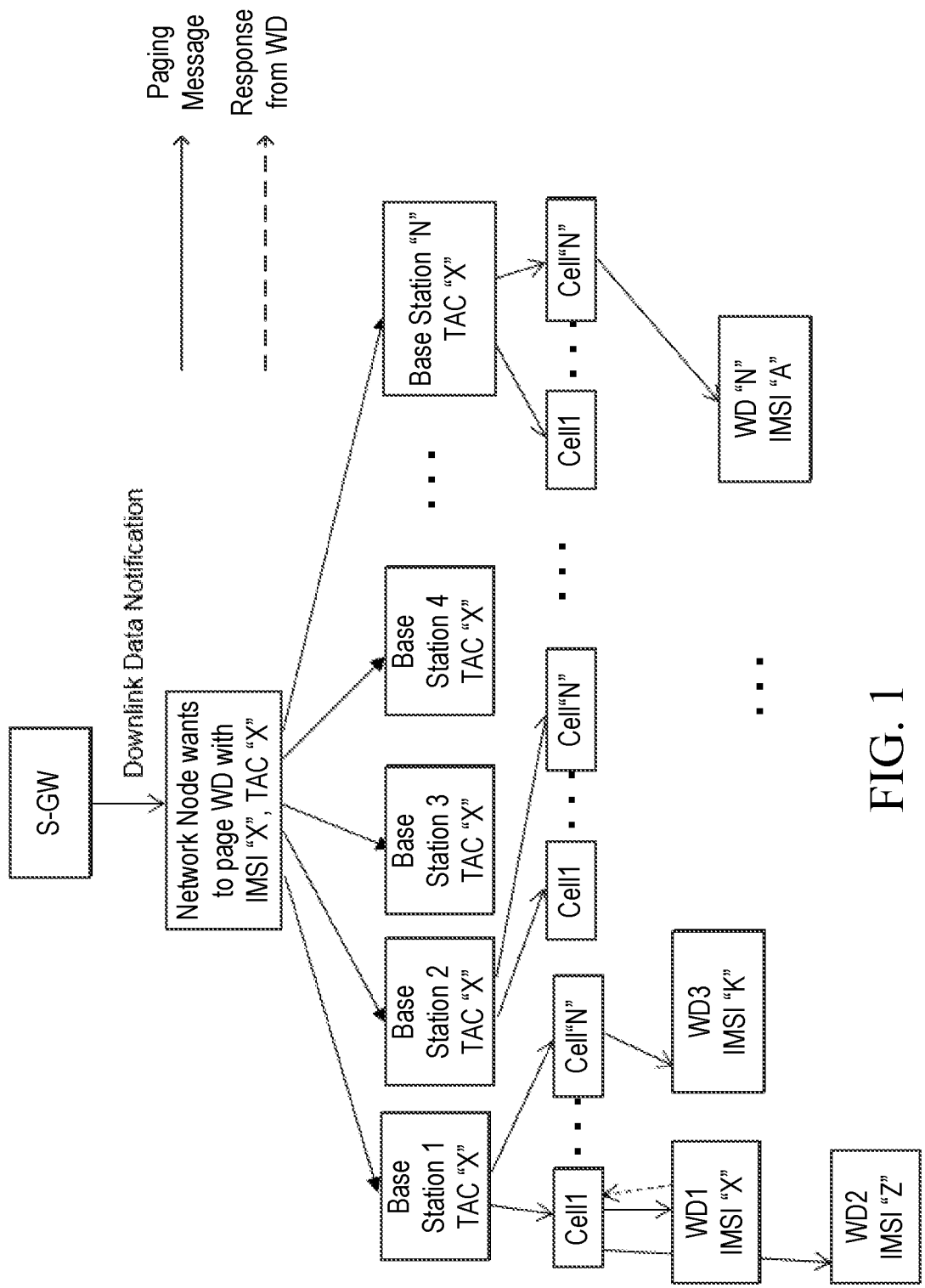
FIG. 1 is a block diagram of a conventional paging distribution.

Before describing in detail exemplary embodiments, it is noted that the embodiments reside primarily in combinations of apparatus components and processing steps related to enhanced paging for stationary or low mobility wireless devices. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments provide reduced paging load in a wireless communication network while simultaneously reducing the time between paging requests or messages and the paging response for low mobility or stationary wireless device. Next generation wireless communication networks may include millions or billions of devices connected to a wireless communication system. It is noteworthy that most devices in the internet of things may be stationary or may have very low mobility compared to conventional wireless device.

Figure 2:
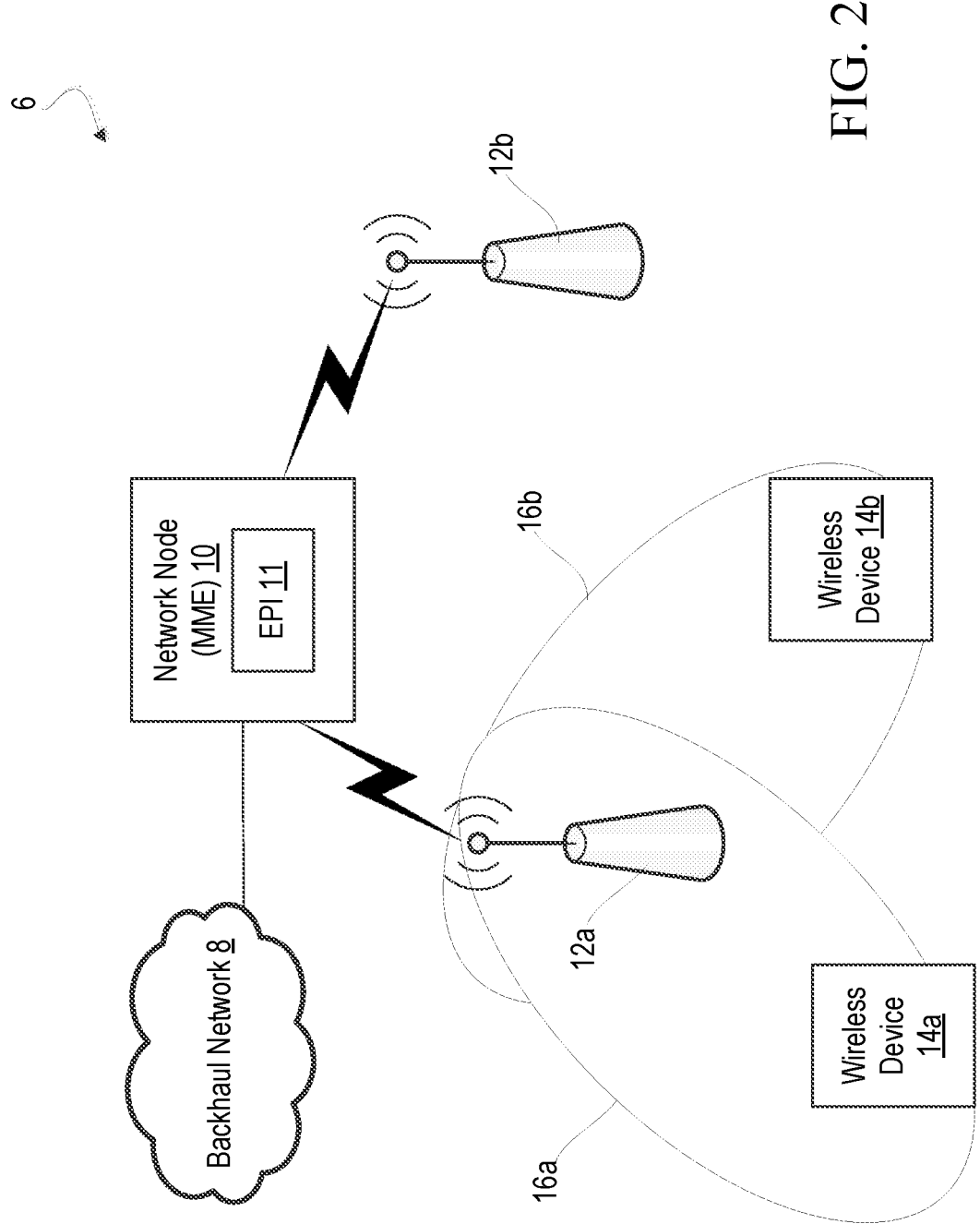
FIG. 2 is a block diagram of wireless communication network using enhance paging identification (EPI) information.

FIG. 2 is a diagram of a wireless communication system 6 connected to a backhaul network 8 which may include the Internet and/or the public switched telephone network (PSTN). The network node 10, e.g., Mobile Management Entity (MME) receives paging requests from the backhaul network 8 or from another network node 10, e.g., MME or base station and forwards the paging requests to a base station 12a or 12b, referred to collectively herein as base stations 12. A base station 12 may communicate with a plurality of wireless devices 14, such as wireless devices 14a and 14b. Note that although an MME is shown in FIG. 2, the functions of this network element may be performed in any network node designed according to descriptions herein, including a base station.

In some embodiments, a wireless device may inform the network node 10 upon initial attachment to the radio access network that it is a stationary-type or low mobility-type wireless device when reporting its capability to the network node 10 and intervening base station 12.

The wireless device 14 may, via a base station 12, inform a network node 10 such as the mobility management entity (MME) as to whether the wireless device 14 is a stationary or low mobility wireless device. In addition to informing the network node 10 that a wireless device 14 is stationary or of low mobility, the base station 12 may also send to the network node 10 a combination of the international mobile subscriber identity (IMSI), Cell ID, base station ID and tracking area (or location area) code to the network node. Such data is referred to in this document as the enhanced paging identification (EPI) information. Some of this data, such as the IMSI, is associated with the wireless device 14, and some of this data, such as the base station identification and cell identification, is associated with the base station 12. Note that a base station, such as base station 12a may serve more than one geographic area referred to as a cell 16, such as cells 16a and 16b.

Figure 3:
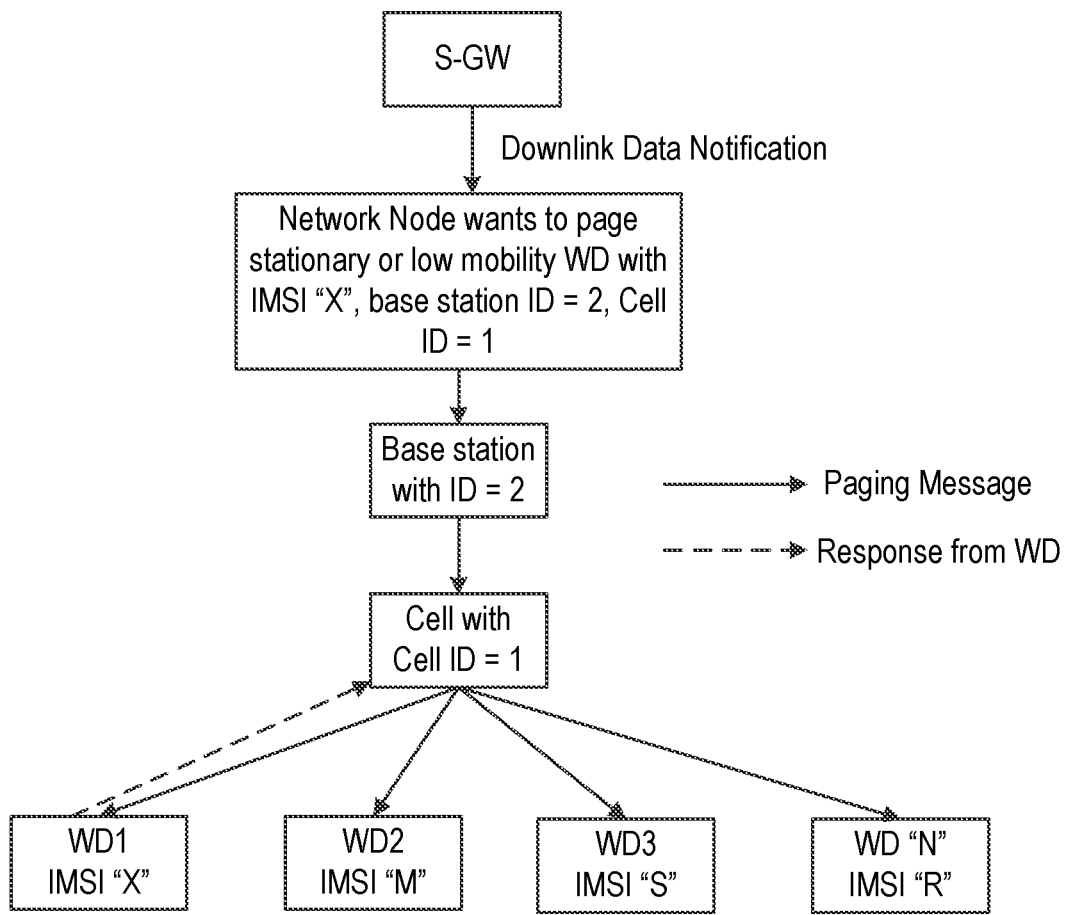
FIG. 3 is a block diagram of regulated paging according to embodiments described herein.

FIG. 3 illustrates distribution of a paging request according to embodiments described herein. Note that, in comparison to the conventional method shown in FIG. 1, distribution involves only the base station and cell where the device to be paged is located. Note also, that a serving gateway be interposed between the network node 10, e.g., MME, and the backhaul network.

The EPI information 11 may be stored in the network node 10, such as a mobility management entity (MME), and updated when the wireless device (with a unique IMSI) has a change in eNodeB or base station ID or a change in cell ID as a result of wireless device being connected to a different eNodeB or base station 12 or a different Cell 16. It is expected that this may not happen very often when the wireless device 14 is stationary or has low mobility. The term "low mobility" is used herein to refer to wireless devices that do not move very fast, an example of which is a wireless device that is not in a fast moving vehicle, but rather, is in the possession of a slow moving, i.e., walking, pedestrian. Mobility status refers to whether the wireless device is stationary or has low mobility.

The EPI information is deleted from a previous network node 10 when the wireless device moves from its previous network node 10 to a new current network node 10. The new current network node 10 then has the EPI information. As soon as the previous EPI information is deleted from the previous network node 10, the new current network node 10 stores the EPI information 11 so that at any point in time, the EPI information is in just one network node 10 and may be unique. Thus, an IMSI value can only have one base station ID and one Cell ID. Note that although some embodiments may be implemented in a long term evolution (LTE) network having eNodeBs, the embodiments are not restricted to LTE systems and may implemented using base stations 12 other than eNodeBs and in wireless networks other than those based on LTE.

There are multiple reasons for a wireless device to leave a cell, e.g., cell 14a, and attach to a new cell, e.g., cell 14b. Such reasons include a cell or base station 12 failing, an antenna of a current cell or other cells being manually or electrically tilted, or experiencing a temporary or permanent physical obstruction, rebooting of the wireless device 14 or rebooting of a base station 12. The wireless device 14 may, in such cases, inform the base station 12 of the network node ID it was previously connected to and the base station 12 may send the fact that the wireless device 14 is a stationary or low mobility type and also send the Cell ID and base station ID to the current network node 10. When the current network node 10, e.g., MME, receives this information, the network node 10 may check if the previous network node ID is the same as the current network node ID for this IMSI. If the network node ID of the previous and current network node are the same, the current network node 10 may compare the previous and current base station ID as well as the previous and current Cell ID for this IMSI and update the EPI value if there is a difference.

If the previous and current network node ID are different, the current network node 10 may send a message to the previous network node to delete the EPI value for this IMSI and the previous network node may respond back to the current network node once the deletion is completed, and the current network node may then store the EPI information 11 for this IMSI.

In the case of cell reselection in Idle mode, the wireless device 14 upon detecting a change in cell may send a message to the base station 12. In the alternative, the base station 12 to which the wireless device is attached may forward the base station ID and Cell ID as well as the previous network node ID to the current network node 10. The checks of the network node IDs, described above may occur. After sending the message and an inactivity timer expires, the wireless device 14 may go back to idle mode.

Because embodiments are directed to stationary or low mobility wireless devices, signaling for updating of the EPI information will rarely be needed since the wireless device may be completely stationary or move about rarely. Therefore, the EPI information will stay the same most of the time.

When an network node 10 receives a downlink data notification from the serving gateway (S-GW), when there is a paging message for a wireless device 14, with the IMSI for the wireless device to be paged, the network node 10 can map the IMSI to the EPI information and derive the base station ID and Cell ID corresponding to the wireless device 14 to which the paging request is sent. The network node 10 then sends the paging request or message to only the eNodeB or base station 12 having the wireless device 14 with that IMSI. The network node 10 may start a timer after sending the paging request or message to the base station 12.

The base station 12, upon receiving the paging request or message from the network node 10, may forward the paging message to only the cell whose ID is in the paging message received from the network node 10. This paging message may be broadcast to all wireless devices 14 connected to this cell. Each wireless device 14 in the cell receiving the paging message may decode the paging message to determine if the page is meant for a particular wireless device. Then the wireless device for which the paging message is meant, shall send on the random access channel (RACH) a service request or extended service request to the network node 10. The network node 10 may then stop the timer it started after sending the paging message/request to the base station 12. If the network node 10 fails to receive the service request message before the timer expires, the network node 10 may resend the paging message up to a certain predefined number of times.

Figure 4:
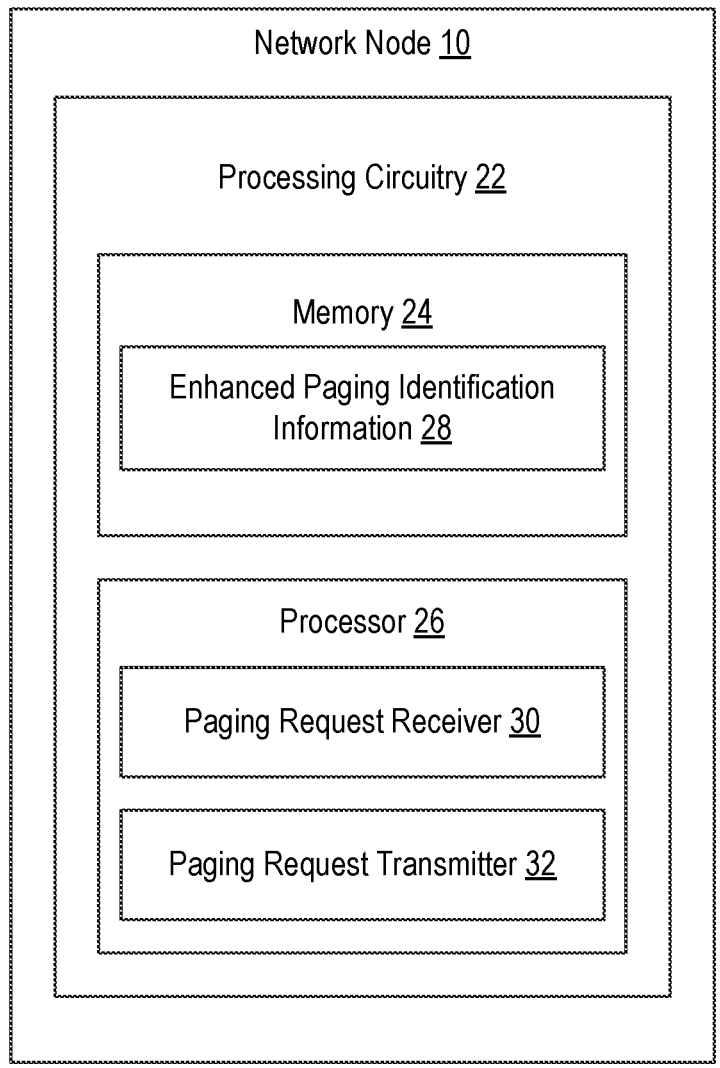
FIG. 4 is a block diagram of a network node for regulating paging.

FIG. 4 is a block diagram of a network node 10 which may be implemented as an network node and configured to regulate paging of wireless devices in a wireless communication system as discussed above with reference to network node 10. The network node 10 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may comprise and/or be connected to and/or be configured for accessing, e.g., writing to and/or reading from, memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store EPI information 28. The EPI information 28 may include an identification of the wireless device, an identification of a base station serving the wireless device, and a status of the wireless device as being one of a stationary device and a low mobility device. The processor 26 is configured to receive a paging request by emulating a paging request receiver 30 that identifies a wireless device to be paged. The processor 26 is further configured to transmit a paging request by emulating a paging request transmitter 32 that transmits the paging request to only the base station serving the wireless device, as indicated by the EPI information 28.

Figure 5:
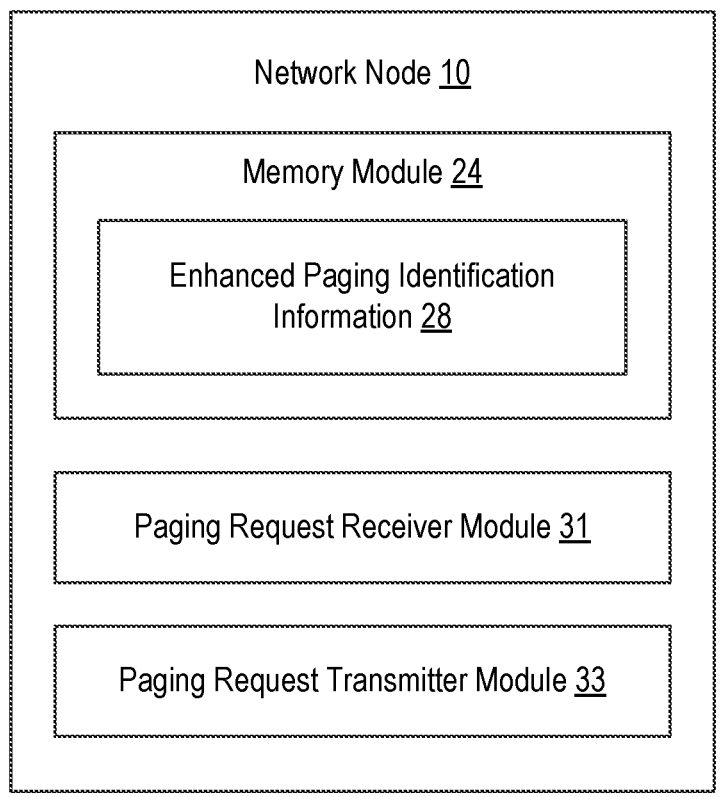
FIG. 5 is an alternative block diagram of a network node for regulating paging.

FIG. 5 is an alternative embodiment of a network node 10 that may be implemented as software modules having computer code that, when executed by a processor, perform functions described above with reference to FIG. 4 with respect to the network node 10. The network node 10 includes a memory module 24 that is configured to store EPI information 28. A paging request receiver module 31 is configured to receive a paging request that identifies the wireless device. A paging request transmitter 33 is configured to transmit the paging request to only the base station serving the wireless device, as indicated by the current EPI information.

Figure 6:
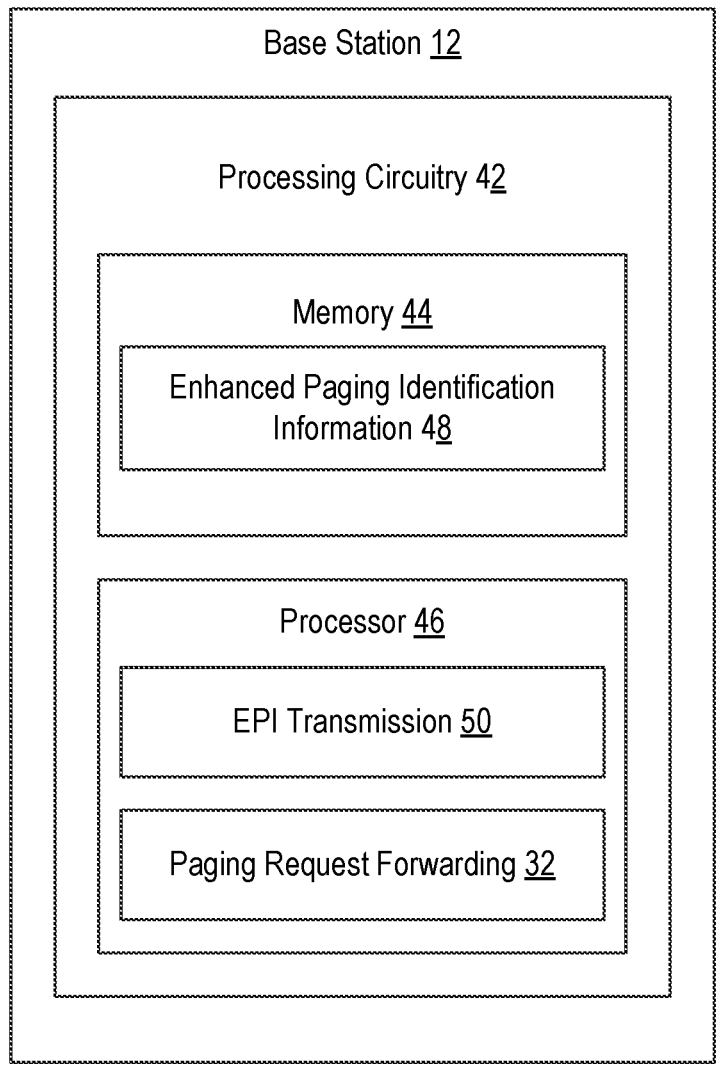
FIG. 6 is a block diagram of a base station for regulating paging.

FIG. 6 is a block diagram of a base station 12 configured to regulate paging of a wireless device in a wireless communication system. The base station 12 includes processing circuitry 42 which includes a memory 44 and a processor 46. The memory 44 is configured to store current EPI information 48. The EPI information 48 includes an identification of a wireless device being served by the base station 12, an identification of the base station 12, and a status of the wireless device as being one of a stationary device and a low mobility device. The processor 46 is configured to facilitate transmission of EPI information 50 to a network node and forwarding of paging requests 52 to a cell where the wireless device is located. In one embodiment, the base station 12 is an eNodeB.

In some embodiments, the processing circuitry 42 may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may comprise and/or be connected to and/or be configured for accessing, e.g., writing to and/or reading from, memory 44, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 22.

Figure 7:
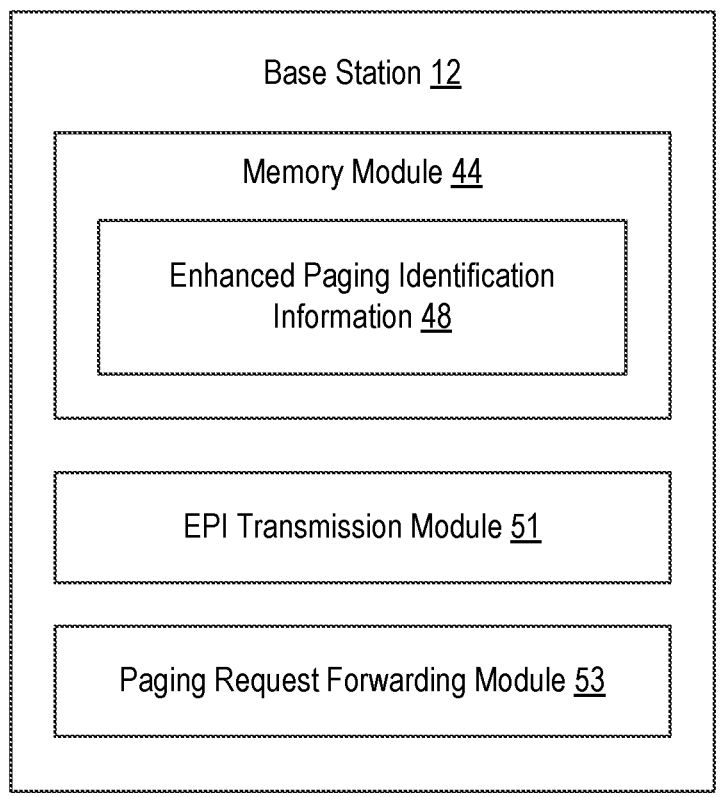
FIG. 7 is an alternative block diagram of a base station for regulating paging.

FIG. 7 is an alternative embodiment of the base station 12 having a memory module 44 that stores EPI information 48. The base station 12 includes a EPI transmission module 51 configured to send the EPI information to a network node. The base station 12 also includes a paging request forwarding module 53 configured to forward a paging request to a cell where the wireless device is configured. The modules 51 and 53 may be implemented as software modules containing computer code implemented by a processor.

Figure 8:
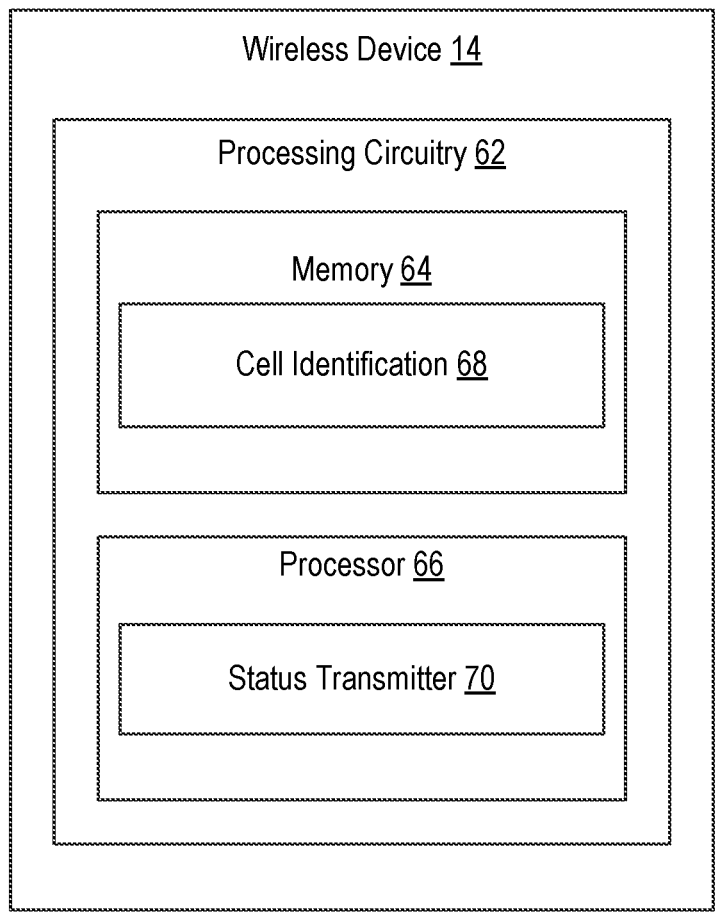
FIG. 8 is a block diagram of a wireless device having a reduced mobility status.

FIG. 8 is a block diagram of a wireless device 14 having a status of one of being stationary and of low mobility. The wireless device 14 includes processing circuitry 62 that includes memory 64 and a processor 66. The memory 64 includes cell identifications 68. The processor 66 is configured to forward status information of the wireless device to a base station, such as base station 12, via a status transmitter 70.

In some embodiments, the processing circuitry may include a memory 64 and processor 66, the memory 64 containing instructions which, when executed by the processor 66, configure processor 66 to perform the one or more functions described herein. In addition to a traditional processor and memory, processing circuitry 62 may comprise integrated circuitry for processing and/or control, e.g., one or more processors and/or processor cores and/or FPGAs (Field Programmable Gate Array) and/or ASICs (Application Specific Integrated Circuitry).

Processing circuitry 62 may comprise and/or be connected to and/or be configured for accessing, e.g., writing to and/or reading from, memory 64, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 64 may be configured to store code executable by control circuitry and/or other data, e.g., data pertaining to communication, e.g., configuration and/or address data of nodes, etc. Processing circuitry 62 may be configured to control any of the methods described herein and/or to cause such methods to be performed, e.g., by processor 66. Corresponding instructions may be stored in the memory 64, which may be readable and/or readably connected to the processing circuitry 62. In other words, processing circuitry 62 may include a controller, which may comprise a microprocessor and/or microcontroller and/or FPGA (Field-Programmable Gate Array) device and/or ASIC (Application Specific Integrated Circuit) device. It may be considered that processing circuitry 62 includes or may be connected or connectable to memory, which may be configured to be accessible for reading and/or writing by the controller and/or processing circuitry 62.

Figure 9:
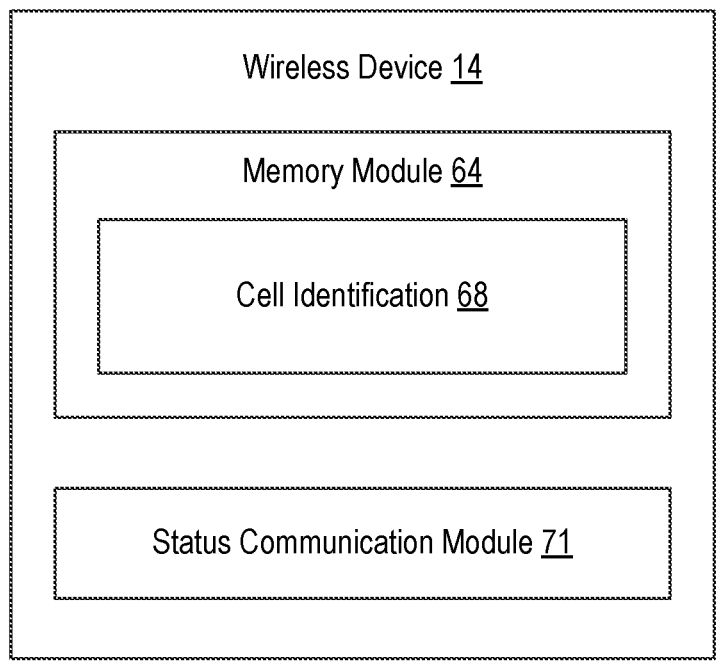
FIG. 9 is an alternative block diagram of a wireless device having a reduced mobility status.

FIG. 9 is a block diagram of an alternative embodiment of a wireless device 14 in which a status communication module 71 is a software module containing computer instructions that when executed by a processor, cause the processor to forward status information of the wireless device to a base station such as base station 12.

Figure 10:
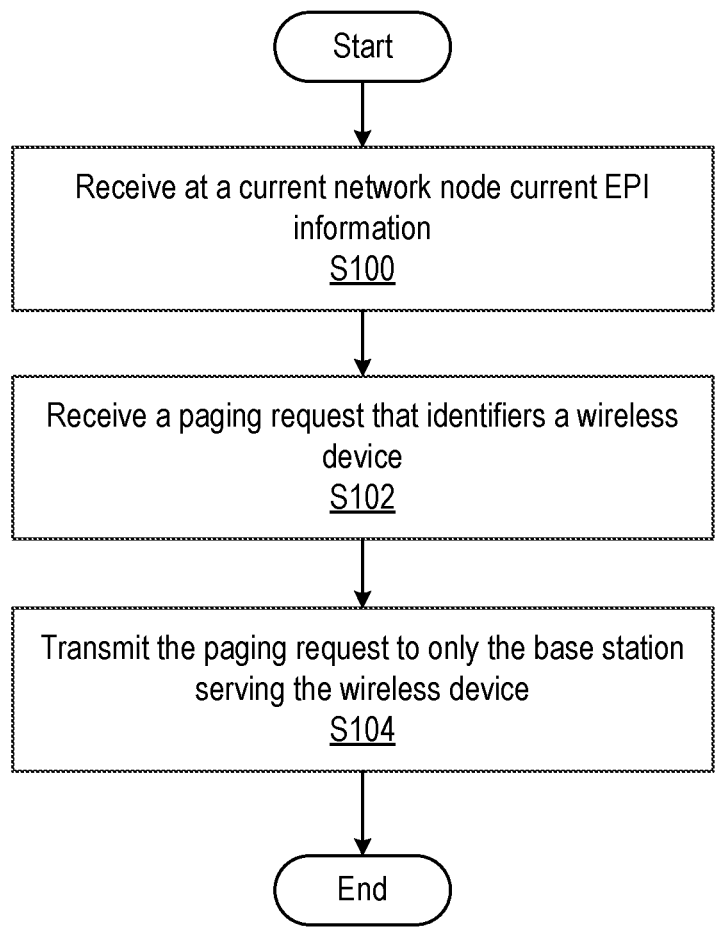
FIG. 10 is a flowchart of an exemplary process in a network node of regulating paging.

FIG. 10 is a flowchart of an exemplary process for regulating paging in a wireless communication system. The process includes receiving at a current network node 10, current EPI information (block S100). The EPI information includes an identification of the wireless device 14, an identification of a base station 12 serving the wireless device 14, and a status of the wireless device 14 as being one of a stationary device and a low mobility device. The process also includes receiving a paging request that identifies a wireless device 14 (block S102). The paging request is transmitted to only the base station 12 identified as serving the wireless device 14 (block S104).

Figure 11:
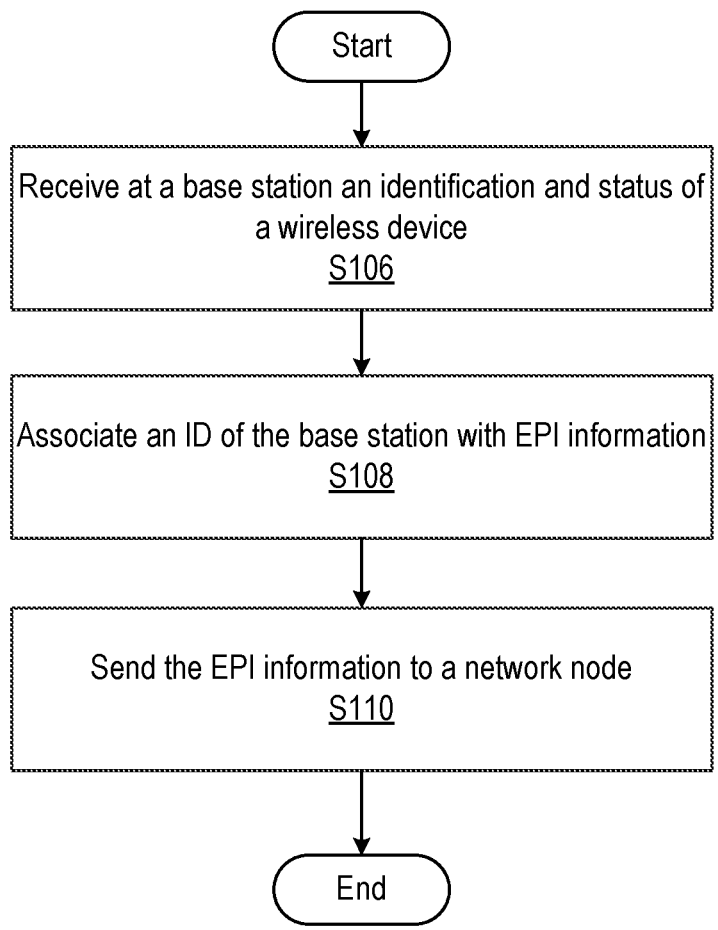
FIG. 11 is flowchart of an exemplary process in a base station of regulating paging.

FIG. 11 is a flowchart of an exemplary process in a base station for regulating paging in a wireless communication system. The process includes receiving at a base station 12 an identification and mobility status of a wireless device 14 (block S106). The process also includes associating the base station ID with EPI information pertaining to the wireless device 14 (block S108). The combined EPI information, which includes the base station 12 and cell ID, is sent to a network node 10 such as the network node shown in FIG. 2. (block S110). The network node uses this information when deciding where to send a paging request.

Figure 12:
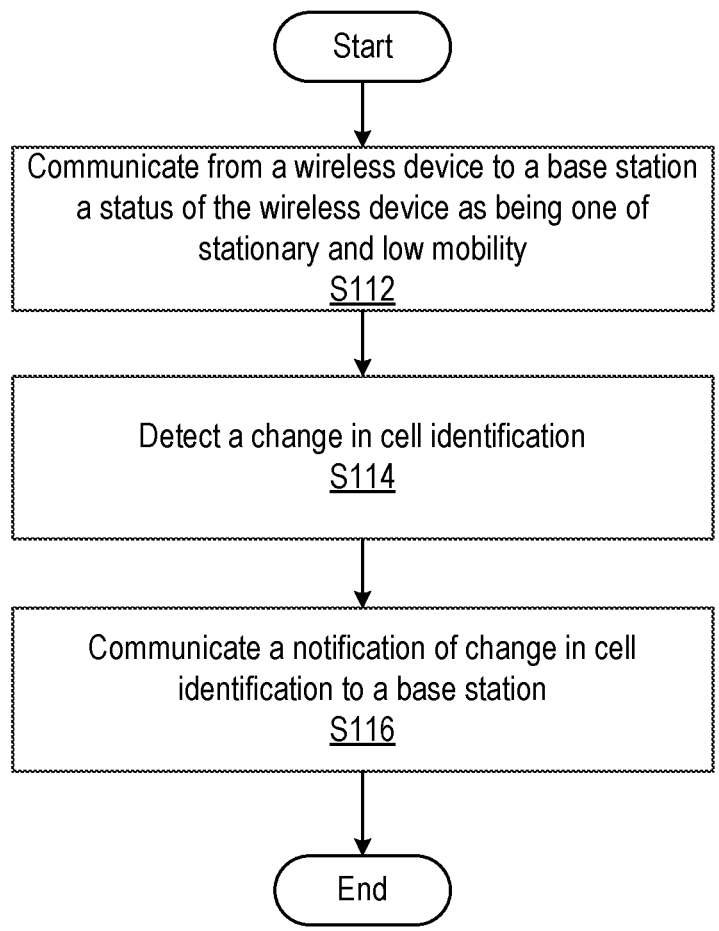
FIG. 12 is a flowchart of an exemplary process in a wireless device of reporting mobility status and detecting a new cell ID.

FIG. 12 is a flowchart of an exemplary process in a wireless device for reporting mobility status. The process includes communicating from the wireless device 14 to a base station 12 serving the wireless device 14 that the wireless device's mobility status is one of stationary and low mobility (block S112). The process also includes detecting at the wireless device 14 a change in cell identification (block S114). A notification of the detected change in cell ID is reported to the base station 12 (block S116). The base station reports this information with the other EPI information to the network node 10, which uses this information in deciding where to send a paging request.

Figure 13:
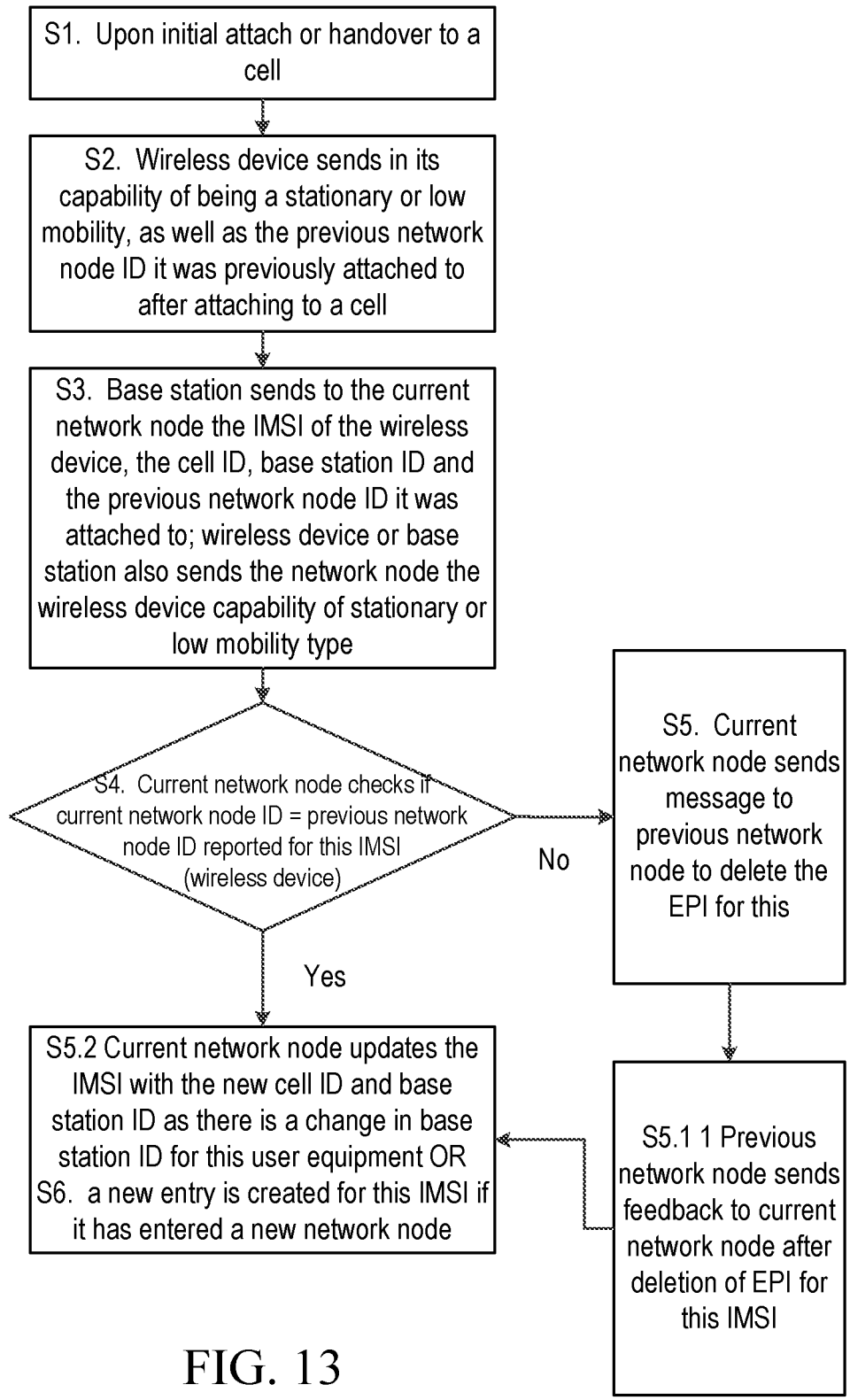
FIG. 13 is flowchart of an exemplary process for initial attachment or handover to a base station.

FIG. 13 is a flowchart of an exemplary process for handling paging when the wireless device 14 initially attaches to a base station 12 or is handed over to the base station 12. Upon initial attachment or handover to a cell (S1), the wireless device 14 sends its capability of being stationary or low mobility, as well as the previous network node ID it was attached to after attaching to a cell (S2). The base station 12 sends to the current network node 10 the IMSI of the wireless device 14, the cell id, eNodeB or base station ID and the previous network node ID it was attached to. The wireless device 14 or base station 12 also sends to the network node 10, the mobility status of the wireless 14, (i.e., whether the wireless device 14 is of a stationary or low mobility type (S3).

In some embodiments, the current network node 10 checks to see if the previous network node is the same as the current network node (S4). If not, the current network node 10 sends a message to the previous network node to delete its EPI for this mobile device 14 (S5). In response, the previous network node sends feedback to the current network node 10 after the deletion (S5.1). If the current network node 10 and previous network node are the same, the current network node 10 updates the IMSI with the new cell ID and base station ID if there is a change in base station ID for this IMSI (S5.2) or a new entry is created if the wireless device 14 has entered a new network node (S6).

Figure 14:
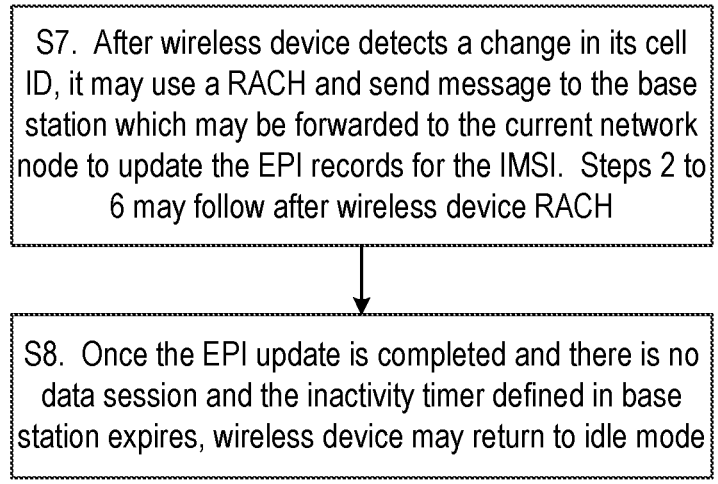
FIG. 14 is a flowchart of an exemplary process for updating EPI data when a change in cell occurs.

As shown in FIG. 14, after the wireless device detects a change in cell ID, the wireless device 14 may use an RACH to send a message to the base station 12 which may forward the new cell ID to the current network node 10 (S7) and steps (S2)-(S6) may be repeated. Once the EPI information update is completed and there is no data session and an inactivity timer defined in the base station 12 expires, the wireless device 14 may return to an idle mode (S8).

Figure 15:
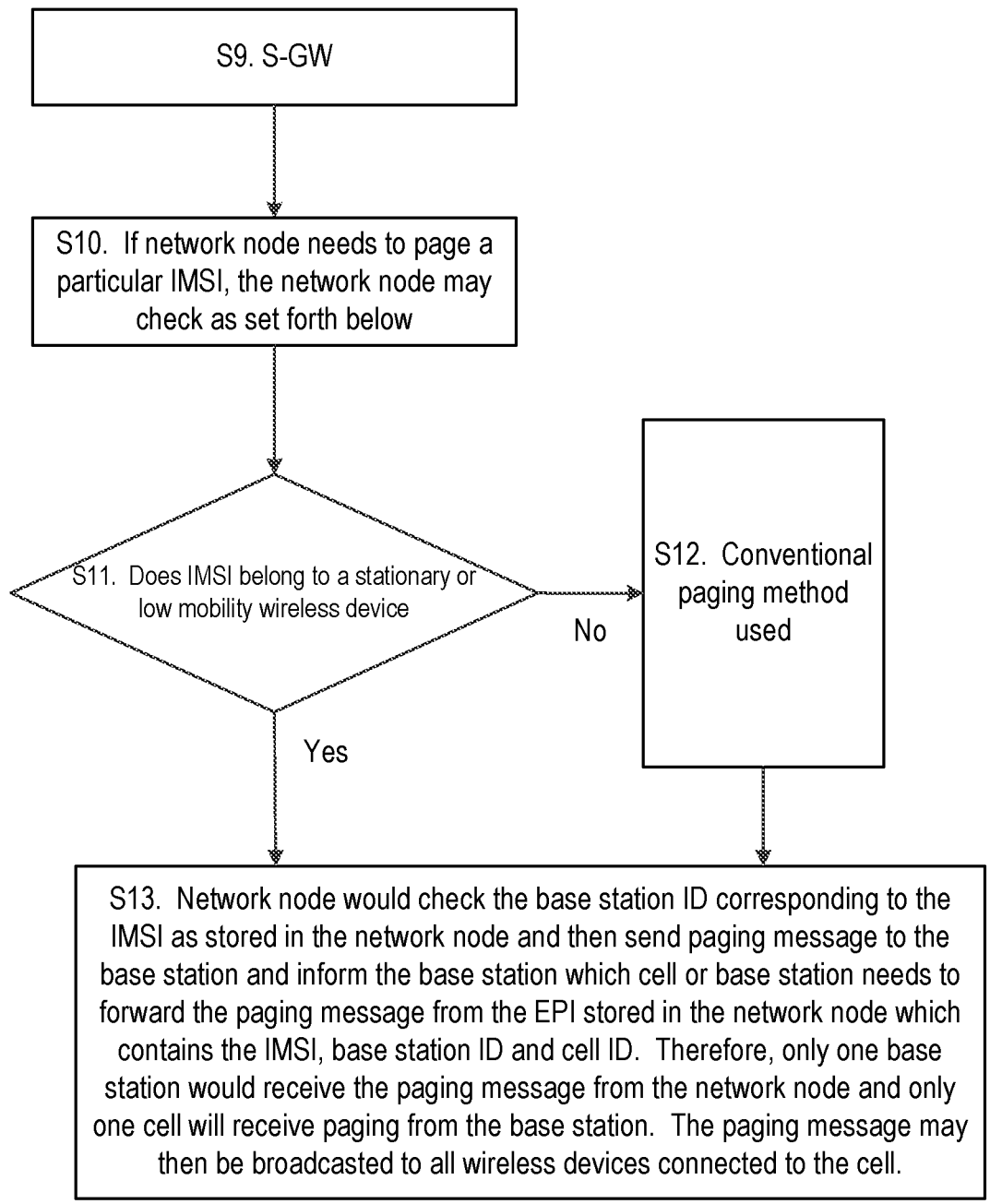
FIG. 15 is a flowchart of an exemplary process for paging a wireless device having low mobility status.

As shown in FIG. 15, when a serving gateway initiates a downlink data notification (S9) a determination is made whether the current network node 10 should page a particular wireless device 14 (S10). If the IMSI of the wireless device 14 indicates that the mobility status of the wireless device 14 is not stationary and not low mobility (S11) conventional paging is used (S12). Otherwise, the network node 10 may check the base station ID corresponding to the IMSI and sends a paging message to the base station 12 and informs the base station 12 to which cell the paging message is to be sent. Only one base station 14 and one cell 16 receives the paging request (S13). Note that the processes shown in FIGS. 13-15 may be performed in or out of sequence.

It is noted that the various functions and processes described herein need not be implemented in a single device. For example, the functions described as being performed by the network node 10, the wireless device 14 and the base station 12 need not be performed in a single physical one of those elements. It is contemplated that the functions and processes described herein can be distributed over several physical nodes and/or devices.

Some embodiments include:

Embodiment 1

A method of regulating paging of a wireless device 14 in a wireless communication system 6, the method comprising:
receiving, at a current network node 10, current enhanced paging identification, EPI, information, the EPI information including an identification of the wireless device 14, an identification of a base station 12 serving the wireless device 14, and a status of the wireless device 14 as being one of a stationary device and a low mobility device;
receiving a paging request that identifies the wireless device 14; and
transmitting the paging request to only the base station serving the wireless device 14 as indicated by the current EPI information.

Embodiment 2

The method of Embodiment 1, wherein the paging request further identifies the cell where the wireless device 14 is located and the EPI information further includes the cell identification where the wireless device 14 is located.

Embodiment 3

The method of Embodiment 1, wherein the current EPI information further includes a network node identification that identifies a previous network node 12 to which the wireless device 14 was attached.

Embodiment 4

The method of Embodiment 3, further comprising comparing the previous network node identification to an identification of the current network node 10, and when the current network node identification is different from the previous network node identification, sending a deletion request to the previous network node 10 to cause deletion of previous EPI information at the previous network node 10 corresponding to the wireless device 14.

Embodiment 5

The method of Embodiment 1, wherein the network node 10 is a mobile management entity, MME.

Embodiment 6

A network node 10 configured to regulate paging of a wireless device 14 in a wireless communication system 6, the network node 10 comprising:

processing circuitry 22 including a processor 26 and a memory 24:
  the memory 24 configured to store current enhanced paging identification, EPI, information, the current EPI information including an identification of a wireless device 14, an identification of a base station 12 serving the wireless device 14, and a status of the wireless device 14 as being one of a stationary device and a low mobility device; and
  the processor 26 configured to:
    receive a paging request that identifies the wireless device 14; and
    transmit the paging request to only the base station 12 serving the wireless device 14, as indicated by the current EPI information.

Embodiment 7

The network node 10 of Embodiment 6, wherein the paging request further identifies the cell where the wireless device 14 is located and the EPI information further includes the cell identification where the wireless device 14 is located.

Embodiment 8

The network node 10 of Embodiment 6, wherein the current EPI information further includes a network node identification that identifies a previous network node 10 to which the wireless device 14 was attached.

Embodiment 9

The network node 10 of Embodiment 6, wherein the processor 26 is further configured to compare a previous network node identification to a current network node identification, and when the current network node identification is different from the previous network node identification, sending a deletion request to the previous network node 10 to cause deletion of a previous EPI corresponding to the wireless device 14.

Embodiment 10

The network node 10 of Embodiment 6, wherein the network node 10 is a mobile management entity, MME.

Embodiment 11

A network node 10 configured to regulate paging of a wireless device 14 in a wireless communication system 6, the network node 10 comprising:
  a memory module 24 configured to store current enhanced paging identification, EPI, information, the current EPI information including an identification of a wireless device 14, an identification of a base station 12 serving the wireless device 14, and a status of the wireless device 14 as being one of a stationary device and a low mobility device; and
  a paging request receiver module 31 configured to receive a paging request that identifies the wireless device 14; and
  a paging request transmitter module 33 configured to transmit the paging request to only the base station 12 serving the wireless device 14, as indicated by the current EPI information.

Embodiment 12

A method of regulating paging of a wireless device 14 in a wireless communication system 6, the method comprising:
  receiving at a base station 12 an identification of a wireless device 14 and a status of a wireless device 14 as being one of a stationary device and a low mobility device;
  associating the identification and status of the wireless device 14 with an identification of the base station 12, the identification and status of the wireless device 14 and the identification of the base station 12 forming enhanced paging identification, EPI information; and
  sending the EPI information to a network node 10.

Embodiment 13

The method of Embodiment 12, further comprising including in the EPI information sent to the network node 10 an identification of a cell where the wireless device 14 is located.

Embodiment 14

The method of Embodiment 13, further comprising receiving a paging request and broadcasting the paging request only to the cell where the wireless device 14 is located.

Embodiment 15

A base station 12 configured to regulate paging of a wireless device 14 in a wireless communication system 6, the base station 12 comprising:
  processing circuitry 22 including a processor 26 and a memory 24:
    the memory 24 configured to store current enhanced paging identification, EPI, information, the EPI information including an identification of a wireless device 14 being served by the base station 12, an identification of the base station 12, and a status of the wireless device 14 as being one of a stationary device and a low mobility device; and
    the processor 26 configured to:
      send the EPI information to a network node 10; and
      forward a paging request to a cell where the wireless device 14 is located.

Embodiment 16

The base station 12 of Embodiment 15, wherein the processor 26 is further configured to send to the network node 10 with the EPI information an identification of a cell where the wireless device 14 is located.

Embodiment 17

The base station 12 of Embodiment 16, wherein the processor 26 is further configured to broadcast a paging request only to the cell where the wireless device 14 is located.

Embodiment 18

A base station 12 configured to regulate paging of a wireless device 14 in a wireless communication system 6, the base station 12 comprising:

a memory module 44 configured to store current enhanced paging identification, EPI, information, the EPI information including an identification of a wireless device 14 being served by the base station 12, an identification of the base station 12, and a status of the wireless device 14 as being one of a stationary device and a low mobility device; and a transmission module 51 configured to send the EPI information to a network node 10; and a paging request forwarding module 53 configured to forward a paging request to a cell where the wireless device 14 is configured.

Embodiment 19

A method in a wireless device 14 having a status of one of being stationary and of low mobility, method comprising:
communicating to a base station 12 serving the wireless device 14 a status of the wireless device 14 as being one of stationary and of low mobility.

Embodiment 20

The method of Embodiment 19, further comprising:
detecting a change in cell identification; and
communicating a notification of a change in cell identification to the base station 12.

Embodiment 21

A wireless device 14 having a status of one of being stationary and of low mobility, the wireless device 14 comprising:
processing circuitry 62 including a memory 64 and a processor 66:
the memory 64 configured to store a cell identification; and
the processor 66 configured to:
communicate to a base station 12 serving the wireless device 14 a status of the wireless device 14 as being one of stationary and of low mobility.

Embodiment 22

The wireless device 14 of Embodiment 21, wherein the processor 66 is further configured to detect a change in cell identification and communicate a notification of the change in cell identification.

Embodiment 23

A wireless device 14 having a status of one of being stationary and of low mobility, the wireless device 14 comprising:
a memory module 64 configured to store a cell identification; and
a status communication module 71 configured to communicate to a base station 12 serving the wireless device 14 a status of the wireless device 14 as being one of stationary and of low mobility.

Some other embodiments include:

According to one aspect of the disclosure, a method of regulating paging of a wireless device 14 in a wireless communication system 6 is provided. Current enhanced paging identification, EPI, information is received at a current network node 10. The EPI information includes an identification of the wireless device 14, an identification of a base station 12 serving the wireless device 14, and a status of the wireless device 14 as being one of a stationary device and a low mobility device. A paging request that identifies the wireless device is received. The paging request is transmitted to only the base station 12 serving the wireless device 14 as indicated by the current EPI information.

According to one embodiment of this aspect, the paging request further identifies the cell where the wireless device 14 is located and the EPI information further includes the cell identification where the wireless device 14 is located. According to one embodiment of this aspect, the current EPI information further includes a network node identification that identifies a previous network node 10 to which the wireless device 14 was attached. According to one embodiment of this aspect, the previous network node identification is compared to an identification of the current network node 10. When the current network node identification is different from the previous network node identification, a deletion request is sent to the previous network node 10 to cause deletion of previous EPI information at the previous network node 10 corresponding to the wireless device 14.

According to one embodiment of this aspect, the network node 10 is a mobile management entity, MME. According to one embodiment of this aspect, a network node 10 is configured to regulate paging of a wireless device 14 in a wireless communication system 6. The network node 10 includes processing circuitry 22 configured to store current enhanced paging identification, EPI, information. The current EPI information includes an identification of a wireless device 14, an identification of a base station 12 serving the wireless device 14, and a status of the wireless device 14 as being one of a stationary device and a low mobility device. The processing circuitry if further configured to: receive a paging request that identifies the wireless device 14 and transmit the paging request to only the base station 12 serving the wireless device 14, as indicated by the current EPI information.

According to one embodiment of this aspect, the paging request further identifies the cell where the wireless device 14 is located and the EPI information further includes the cell identification where the wireless device 14 is located. According to one embodiment of this aspect, the current EPI information further includes a network node identification that identifies a previous network node 10 to which the wireless device 14 was attached. According to one embodiment of this aspect, the processing circuitry 22 is further configured to compare a previous network node identification to a current network node identification, and when the current network node identification is different from the previous network node identification, a deletion request is sent to the previous network node 10 to cause deletion of a previous EPI corresponding to the wireless device 14. According to one embodiment of this aspect, the network node 10 is a mobile management entity, MME.

According to another aspect of the disclosure, a network node 10 is configured to regulate paging of a wireless device 14 in a wireless communication system 6. The network node 10 includes a memory module 24 configured to store current enhanced paging identification, EPI, information. The current EPI information includes an identification of a wireless device 14, an identification of a base station 12 serving the wireless device 14, and a status of the wireless device 14 as being one of a stationary device and a low mobility device. The network node 10 includes a paging request receiver module 31 configured to receive a paging request that identifies the wireless device 14, and a paging request transmitter module 33 configured to transmit the paging request to only the base station 12 serving the wireless device 14, as indicated by the current EPI information.

According to another aspect of the disclosure, a method of regulating paging of a wireless device 14 in a wireless communication system 6 is provided. An identification of a wireless device 14 and a status of a wireless device 14 as being one of a stationary device and a low mobility device, is received at a base station 12. The identification and status of the wireless device 14 is associated with an identification of the base station 12. The identification and status of the wireless device 14 and the identification of the base station 12 forms enhanced paging identification, EPI information. The EPI information is sent to a network node.

According to one embodiment of this aspect, the EPI information sent to the network node includes an identification of a cell where the wireless device is located. According to one embodiment of this aspect, a paging request is received and the paging request is broadcast only to the cell where the wireless device is located.

According to another aspect of the disclosure, a base station configured to regulate paging of a wireless device in a wireless communication system. The base station includes processing circuitry 42 configured to store current enhanced paging identification, EPI, information. The EPI information includes an identification of a wireless device is served by the base station, an identification of the base station, and a status of the wireless device 14 as being one of a stationary device and a low mobility device. The processing circuitry 42 is configured to send the EPI information to a network node 10, and forward a paging request to a cell where the wireless device 14 is located.

According to one embodiment of this aspect, the processing circuitry 42 is further configured to send to the network node 10 with the EPI information an identification of a cell where the wireless device 14 is located. According to one embodiment of this aspect, the processing circuitry 42 is further configured to broadcast a paging request only to the cell where the wireless device is located.

According to another embodiment of the disclosure, a base station is configured to regulate paging of a wireless device 14 in a wireless communication system 6. The base station 12 includes a memory module 44 configured to store current enhanced paging identification, EPI, information. The EPI information includes an identification of a wireless device 14 is served by the base station 12, an identification of the base station 12, and a status of the wireless device 14 as being one of a stationary device and a low mobility device. The base station 12 includes a transmission module 51 configured to send the EPI information to a network node 10. The base station 12 includes a paging request forwarding module 53 configured to forward a paging request to a cell where the wireless device 14 is configured.

According to another aspect of the disclosure, a method in a wireless device 14 having a status of one of being stationary and of low mobility is provided. A status of the wireless device 14 as being one of stationary and of low mobility is communicated to a base station 12 serving the wireless device 14.

According to one embodiment of this aspect, a change in cell identification is detected and a notification of a change in cell identification is communicated to the base station 12.

According to another aspect of the disclosure, a wireless device 14 having a status of one of being stationary and of low mobility is provided. The wireless device 14 includes processing circuitry 62 configured to store a cell identification, and to communicate to a base station 12 serving the wireless device 14 a status of the wireless device 14 as being one of stationary and of low mobility.

According to one embodiment of this aspect, the processing circuitry 62 is further configured to detect a change in cell identification and communicate a notification of the change in cell identification.

According to another aspect of the disclosure, a wireless device 14 having a status of one of being stationary and of low mobility is provided. The wireless device 14 includes a memory module 64 configured to store a cell identification, and a status communication module 71 configured to communicate to a base station 12 serving the wireless device 14 a status of the wireless device 14 as being one of stationary and of low mobility.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings which is limited only by the claims.

What is claimed is:

1. A method of regulating paging of a wireless device in a wireless communication system, the method comprising:
receiving, at a current network node, current enhanced paging identification, EPI, information, the EPI information including an identification of the wireless device, an identification of a base station serving the wireless device, and a status of the wireless device as being one of a stationary device and a low mobility device, wherein the current EPI information further includes a network node identification that identifies a previous network node to which the wireless device was attached;
comparing the previous network node identification to an identification of the current network node, and when the current network node identification is different from the previous network node identification, sending a deletion request to the previous network node to cause deletion of previous EPI information at the previous network node corresponding to the wireless device;
storing the received EPI information at the current network node;
receiving a paging request that identifies the wireless device; and
transmitting the paging request to only the base station serving the wireless device as indicated by the current EPI information.

2. The method of claim 1, wherein the paging request further identifies the cell where the wireless device is located and the EPI information further includes the cell identification where the wireless device is located.

3. The method of claim 1, wherein the network node is a mobile management entity, MME.

4. A network node configured to regulate paging of a wireless device in a wireless communication system, the network node comprising:
processing circuitry configured to:
receive current enhanced paging identification, EPI, information, the EPI information including an identification of the wireless device, an identification of the base station serving the wireless device, and a status of the wireless device as being one of a stationary device and a low mobility device, wherein the current EPI information further includes a network node identification that identifies a previous network node-to which the wireless device was attached;
compare a previous network node identification to a current network node identification, and
when the current network node identification is different from the previous network node identification,
sending a deletion request to the previous network node to cause deletion of a previous EPI corresponding to the wireless device;
store the current EPI information;
receive a paging request from another network node that identifies the wireless device; and
transmit the paging request to only the base station serving the wireless device, as indicated by the current EPI information.

5. The network node of claim 4, wherein the paging request further identifies the cell where the wireless device is located and the EPI information further includes the cell identification where the wireless device is located.

6. The network node of claim 4, wherein the network node is a mobile management entity, MME.

* * * * *